US010631517B2

(12) United States Patent
Kim

(10) Patent No.: US 10,631,517 B2
(45) Date of Patent: Apr. 28, 2020

(54) TRANSPORTATION CONTAINER BLOWER FOR MORTALITY PREVENTION AND WELFARE DURING LIVESTOCK TRANSPORTATION

(71) Applicant: kwang soo Kim, Jeollanam-do (KR)

(72) Inventor: kwang soo Kim, Jeollanam-do (KR)

( * ) Notice: Subject to any disclaimer, the term of this patent is extended or adjusted under 35 U.S.C. 154(b) by 523 days.

(21) Appl. No.: 15/110,939

(22) PCT Filed: Jan. 28, 2014

(86) PCT No.: PCT/KR2014/000771
§ 371 (c)(1),
(2) Date: Jul. 11, 2016

(87) PCT Pub. No.: WO2015/111781
PCT Pub. Date: Jul. 30, 2015

(65) Prior Publication Data
US 2016/0324114 A1   Nov. 10, 2016

(30) Foreign Application Priority Data

Jan. 23, 2014   (KR) .................... 10-2014-0008440

(51) Int. Cl.
*A01K 1/00*   (2006.01)
*B60P 3/04*   (2006.01)
(Continued)

(52) U.S. Cl.
CPC .......... *A01K 1/0052* (2013.01); *A01K 1/0236* (2013.01); *B60H 1/00357* (2013.01);
(Continued)

(58) Field of Classification Search
CPC ............... A01K 1/0236; A01K 1/0052; B60H 1/00564; B60H 1/00014; B60H 1/248;
(Continued)

(56) References Cited

U.S. PATENT DOCUMENTS 1,820,752 A * 8/1931 Masury ..................... B65F 3/00
   123/41.31
2,165,580 A * 7/1939 Scheufler ............ B61D 27/0081
   105/112
(Continued)

FOREIGN PATENT DOCUMENTS

JP        05-032112 U     4/1993
KR   10-2000-0017766 A    4/2000
(Continued)

OTHER PUBLICATIONS

International Search Report for PCT/KR2014/000771 dated Oct. 27, 2014 from Korean Intellectual Property Office.

*Primary Examiner* — Vivek K Shirsat
*Assistant Examiner* — Ko-Wei Lin
(74) *Attorney, Agent, or Firm* — Revolution IP, PLLC

(57) ABSTRACT

Disclosed is a transportation container blower for mortality prevention and welfare during livestock transportation, comprising: a body connected to a transportation means and having a space in which livestock is accommodated therein and a first blowing port formed at each of lower portions of both sides thereof to be opened; a blowing path installed at an upper end of the body to be long in a longitudinal direction thereof and having a second blowing port which is in communication with an inside of the body and formed at a lower end or a side surface thereof; and a blowing means installed at the body and connected to the blowing path.

4 Claims, 4 Drawing Sheets

(51) Int. Cl.
*A01K 1/02* (2006.01)
*B60H 1/00* (2006.01)
*B60H 1/24* (2006.01)
*B60H 1/26* (2006.01)

(52) U.S. Cl.
CPC ......... *B60H 1/00564* (2013.01); *B60H 1/247* (2013.01); *B60H 1/248* (2013.01); *B60H 1/26* (2013.01); *B60P 3/04* (2013.01)

(58) Field of Classification Search
CPC .. B60H 1/3232; B60H 1/00357; B60H 1/247; B60H 1/26; B60H 1/3407; B60P 3/20; B60P 3/04; B61D 27/0081
USPC ...... 454/118, 88, 341, 90–92; 119/400, 401; 62/239
See application file for complete search history.

(56) References Cited

U.S. PATENT DOCUMENTS

| | | | | |
|---|---|---|---|---|
| 2,293,316 A * | 8/1942 | Stebbins | ............ | B61D 27/0081 160/327 |
| 2,332,034 A * | 10/1943 | West | ................. | B61D 27/0081 454/103 |
| 2,524,664 A * | 10/1950 | Henderson | ................ | B60P 1/52 410/92 |
| 2,610,567 A * | 9/1952 | Davis | ................ | B60H 1/00014 119/304 |
| 2,734,444 A * | 2/1956 | Lunn, Jr. et al. | .... | A01K 45/005 119/304 |
| 2,751,882 A * | 6/1956 | Coyner | ..................... | B60P 3/04 119/400 |
| 2,909,983 A * | 10/1959 | Scheck | ................... | F24F 13/12 454/324 |
| 3,421,336 A * | 1/1969 | Lichtenberger | ...... | B60H 1/3202 62/239 |
| 3,844,203 A * | 10/1974 | Takahashi | .............. | B65D 81/07 220/592.2 |
| 4,122,761 A * | 10/1978 | Westin | ................. | B65D 88/745 220/1.5 |
| 4,356,702 A * | 11/1982 | Kuttel | ................... | A23L 3/3418 62/240 |
| 4,377,935 A * | 3/1983 | Curtis | ..................... | F25D 17/08 454/100 |
| 4,454,837 A * | 6/1984 | Luebke | ..................... | B60P 3/04 119/401 |
| 4,481,870 A * | 11/1984 | Smith | ..................... | A01K 45/005 454/88 |
| 4,553,403 A * | 11/1985 | Taylor | ..................... | F25D 17/08 34/225 |
| 4,598,555 A * | 7/1986 | Windecker | ............... | A23B 7/04 62/239 |
| 4,633,767 A * | 1/1987 | Sain | ........................ | B60L 1/00 136/291 |
| 4,665,804 A * | 5/1987 | Miyasaka | ............ | B60H 1/3428 454/315 |
| 4,884,496 A * | 12/1989 | Donavich | ................ | B60P 3/20 454/88 |
| 4,934,255 A * | 6/1990 | McDonnell | ............... | B60P 3/20 236/44 C |
| 4,960,041 A * | 10/1990 | Kiser | ..................... | F24H 3/0488 454/238 |
| 4,979,431 A * | 12/1990 | Fujimoto | ............. | B60H 1/3232 454/91 |
| 4,992,669 A * | 2/1991 | Parmley | ................... | F01B 1/12 123/2 |
| 5,129,235 A * | 7/1992 | Renken | ................. | B60H 1/3232 454/90 |
| 5,666,905 A * | 9/1997 | MacKin | ................. | A01K 1/0047 119/448 |
| 5,671,609 A * | 9/1997 | Lionetti | ............... | A23B 7/0425 454/118 |
| 5,699,960 A * | 12/1997 | Kato | ............... | B60H 1/0065 237/12.3 A |
| 5,830,057 A * | 11/1998 | Hunt, Jr. | ............... | B60H 1/3232 454/118 |
| 5,872,721 A * | 2/1999 | Huston | ................. | A23B 7/148 62/150 |
| 6,289,684 B1 * | 9/2001 | Guidry, II | ............. | F25D 19/003 62/229 |
| 6,470,692 B1 * | 10/2002 | Ziegler | ............... | B60H 1/00014 454/118 |
| 6,478,669 B1 * | 11/2002 | Van | ........................ | B60P 3/20 454/118 |
| 6,502,897 B2 * | 1/2003 | Neuss | ................... | B62D 25/142 296/208 |
| 6,543,827 B2 * | 4/2003 | Miller | ..................... | B60P 3/055 296/24.35 |
| 6,581,544 B1 * | 6/2003 | Smith | ..................... | B60P 3/04 119/401 |
| 6,817,316 B1 * | 11/2004 | Roussy | ..................... | B60P 3/20 119/401 |
| 6,960,244 B2 * | 11/2005 | Lehman | ................. | B01D 46/42 312/1 |
| 7,171,821 B2 * | 2/2007 | Yoong | ..................... | F24F 13/12 236/49.3 |
| 7,310,969 B2 * | 12/2007 | Dale | ..................... | B65D 88/121 454/118 |
| 7,511,960 B2 * | 3/2009 | Hillis | ..................... | G06F 1/20 165/80.4 |
| 7,585,208 B2 * | 9/2009 | Rosales Vizueta | .. | B65D 88/121 454/118 |
| 7,946,124 B2 * | 5/2011 | Klysen | ................... | F25D 17/005 414/266 |
| RE43,429 E * | 5/2012 | Freese | ................... | A23L 3/3418 454/118 |
| 8,441,789 B2 * | 5/2013 | Wu | ..................... | H05K 7/20827 361/679.49 |
| 8,756,827 B1 * | 6/2014 | Calabro | ................. | B05B 16/60 34/487 |
| 8,794,187 B2 * | 8/2014 | Smith | ..................... | B60P 3/04 119/401 |
| 9,155,229 B2 * | 10/2015 | Schmitt | ............... | H05K 7/20745 |
| 9,630,472 B2 * | 4/2017 | Francois | ............ | B60H 1/00014 |
| 9,845,969 B2 * | 12/2017 | Ali | ........................ | F24F 13/14 |
| 9,975,405 B2 * | 5/2018 | Siddiqui | ............ | B60H 1/00364 |
| 10,039,207 B2 * | 7/2018 | Schmitt | ............... | H05K 7/1497 |
| 2002/0045420 A1 * | 4/2002 | Taillon | ............... | B60H 1/00014 454/119 |
| 2002/0088655 A1 * | 7/2002 | Falk | ........................ | B60K 11/08 180/68.3 |
| 2003/0162492 A1 * | 8/2003 | Caferro | ................... | F24F 13/06 454/289 |
| 2004/0127152 A1 * | 7/2004 | Malott | ............... | B60H 1/00364 454/136 |
| 2004/0253919 A1 * | 12/2004 | Dube | ..................... | A01K 1/0064 454/274 |
| 2006/0082263 A1 * | 4/2006 | Rimler | ..................... | B60P 3/14 312/201 |
| 2006/0234620 A1 * | 10/2006 | Mennen | ................. | B60P 3/04 454/118 |
| 2007/0202798 A1 * | 8/2007 | Billiotte | ................. | F24F 3/16 454/264 |
| 2008/0055846 A1 * | 3/2008 | Clidaras | ................. | G06F 1/20 361/679.41 |
| 2008/0064317 A1 * | 3/2008 | Yates | ................. | B65D 88/745 454/118 |
| 2008/0110409 A1 * | 5/2008 | Mennen | ................. | B60P 3/04 119/401 |
| 2009/0241578 A1 * | 10/2009 | Carlson | ................. | F25D 17/06 62/259.2 |
| 2010/0025991 A1 * | 2/2010 | Kim | ..................... | F16L 19/061 285/370 |
| 2010/0099347 A1 * | 4/2010 | Raible | ..................... | B64D 13/00 454/76 |

(56) References Cited

U.S. PATENT DOCUMENTS

| | | | | |
|---|---|---|---|---|
| 2010/0279597 A1* | 11/2010 | Cho | ......................... | F24F 7/10 454/341 |
| 2010/0327574 A1* | 12/2010 | Takahashi | ............... | F16L 37/23 285/33 |
| 2011/0146582 A1* | 6/2011 | Lemmon | .............. | A01K 1/0047 119/448 |
| 2011/0165833 A1* | 7/2011 | Schaefer | ................. | B05B 13/02 454/187 |
| 2012/0161434 A1* | 6/2012 | Wells | ...................... | F16L 25/01 285/222.3 |
| 2012/0298330 A1* | 11/2012 | Mysse, III | ........... | H05K 5/0213 165/96 |
| 2013/0078075 A1* | 3/2013 | Francois | ............ | B60H 1/00014 414/800 |
| 2013/0178143 A1* | 7/2013 | Iden | ........................ | E21F 1/003 454/166 |
| 2013/0341919 A1* | 12/2013 | Dzolovic | ................ | F16L 37/18 285/399 |
| 2014/0364051 A1* | 12/2014 | Iglesias Soto | ......... | B60N 3/104 454/330 |
| 2015/0004899 A1* | 1/2015 | Otsuka | .................... | F24F 3/161 454/341 |
| 2015/0056913 A1* | 2/2015 | Foat | ................... | G01N 33/0057 454/261 |
| 2015/0079890 A1* | 3/2015 | Stutzman | ............... | B01D 46/10 454/49 |
| 2015/0079894 A1* | 3/2015 | Zimmerman | ........ | F24F 11/0001 454/255 |
| 2016/0184873 A1* | 6/2016 | Lee | ......................... | B08B 15/02 414/267 |
| 2017/0232978 A1* | 8/2017 | Zheng | ................... | B66B 11/024 454/70 |

FOREIGN PATENT DOCUMENTS

| | | |
|---|---|---|
| KR | 20-0187126 Y1 | 6/2000 |
| KR | 20-0365427 Y1 | 10/2004 |
| KR | 20-0384412 Y1 | 5/2005 |

* cited by examiner

[Fig. 1]
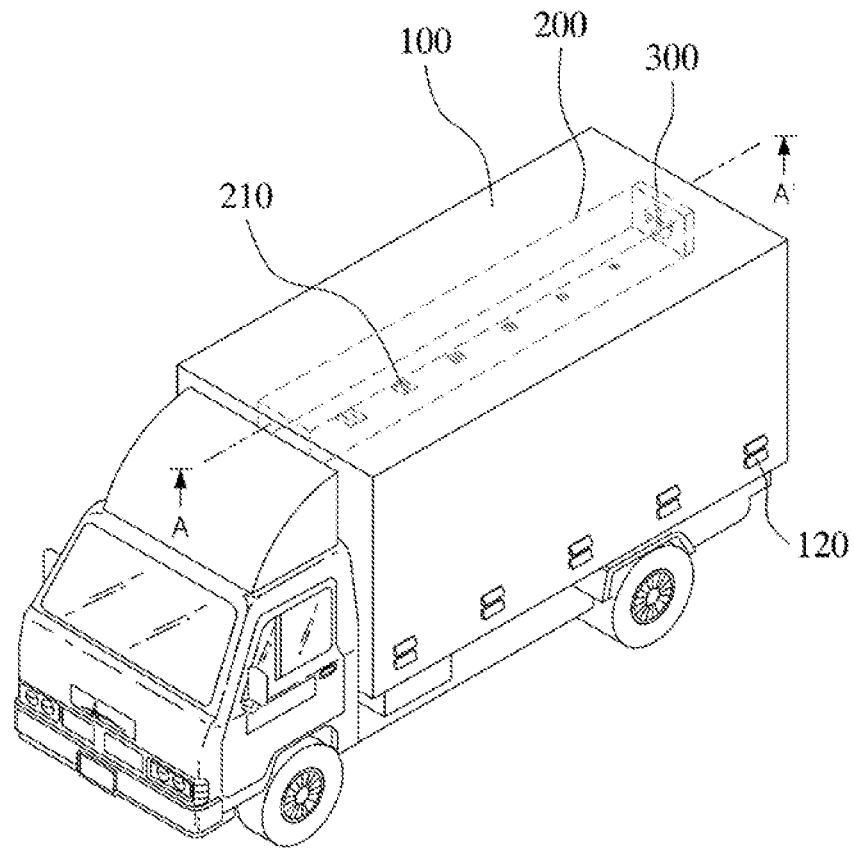
[Fig. 2]
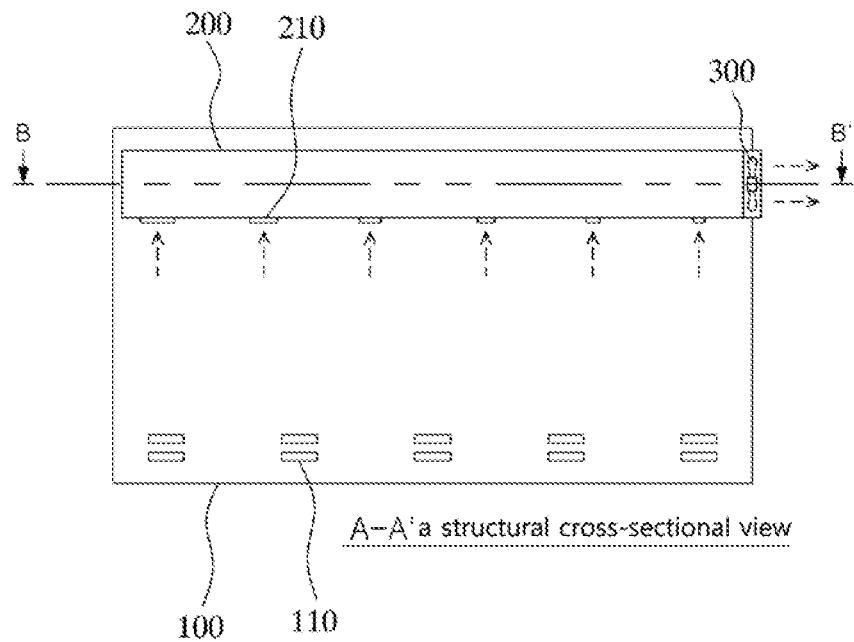

[Fig.3]
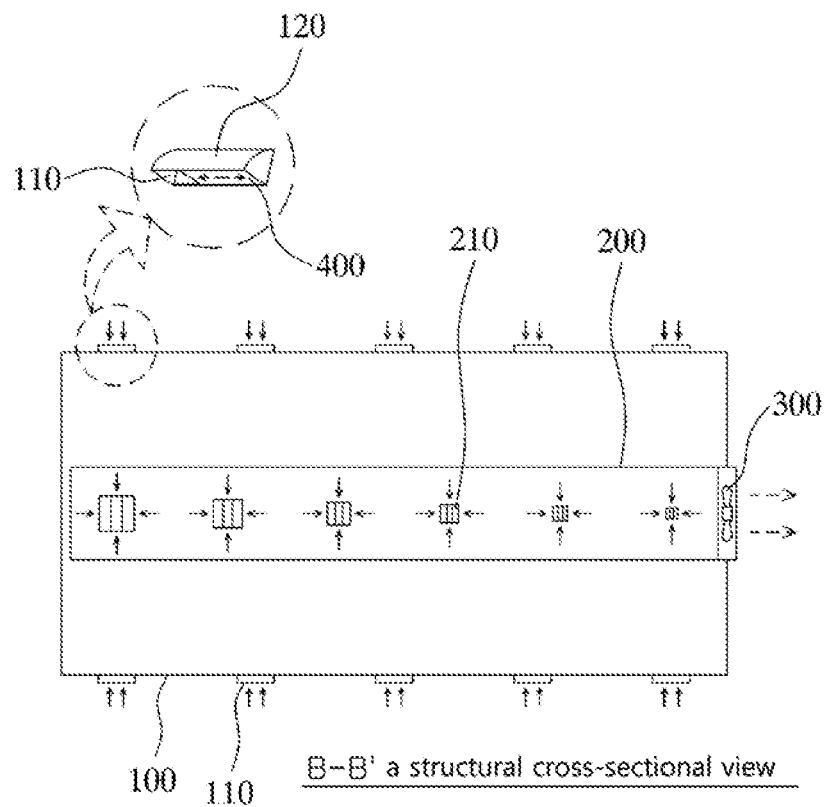
B-B' a structural cross-sectional view
[Fig. 4]
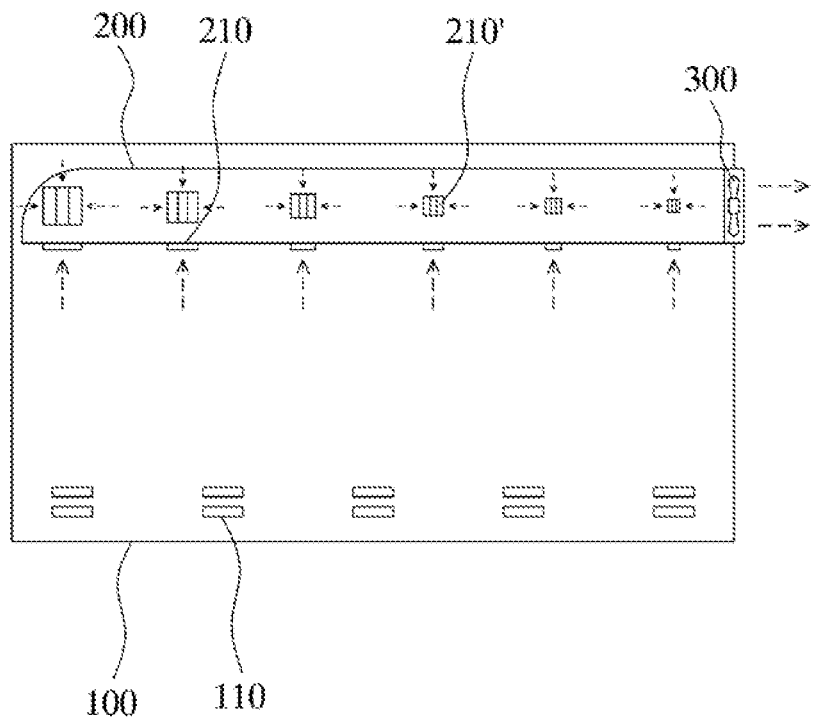

[Fig. 5]
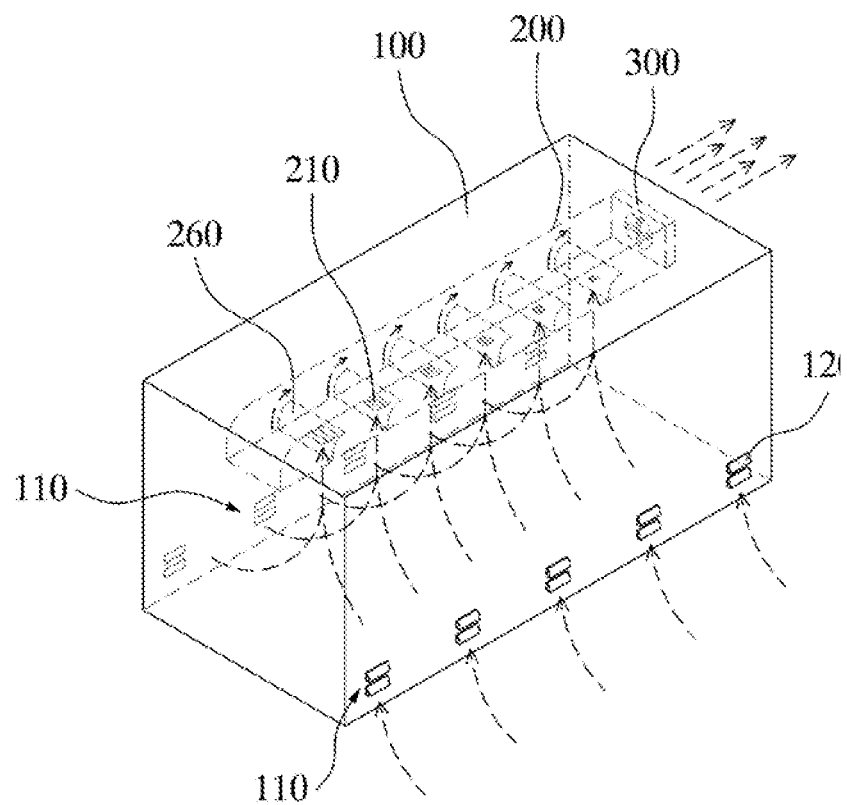
[Fig. 6]
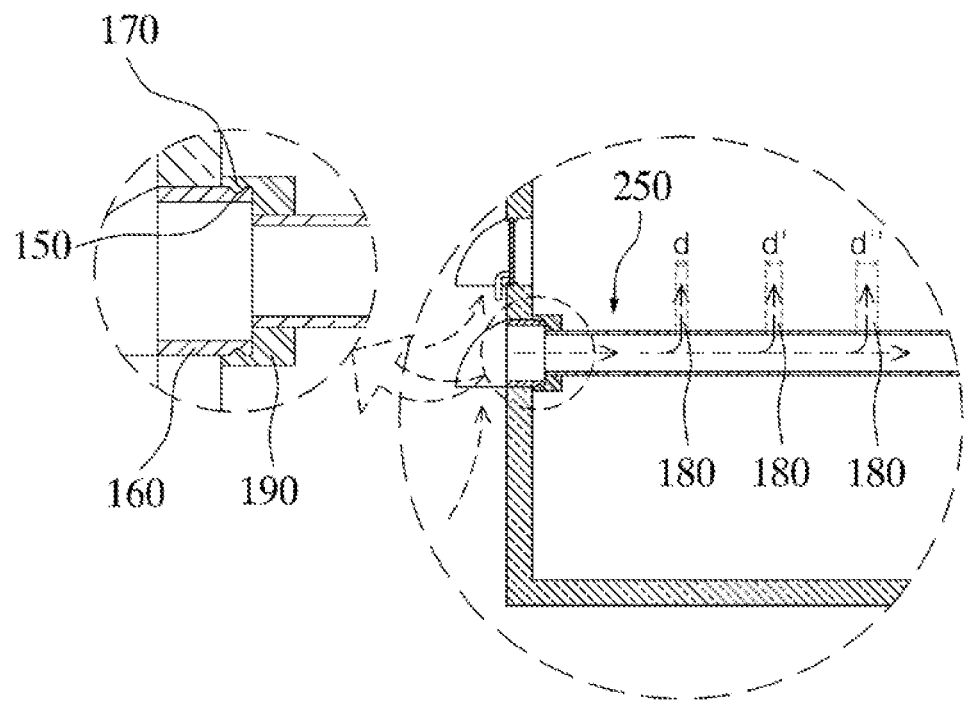

TRANSPORTATION CONTAINER BLOWER FOR MORTALITY PREVENTION AND WELFARE DURING LIVESTOCK TRANSPORTATION

CROSS REFERENCE TO PRIOR APPLICATIONS

This application is a National Stage Application of PCT International Patent Application No. PCT/KR2014/000771 filed on Jan. 28, 2014, under 35 U.S.C. § 371, which claims priority to Korean Patent Application No. 10-2014-0008440 filed on Jan. 23, 2014, which are all hereby incorporated by reference in their entirety.

TECHNICAL FIELD

The present invention relates to a blower which is installed at a transportation container (including a screen fence and tent) for livestock hygiene, and particularly, to a blower for transportation, which is installed at a transportation means to maintain internal temperature and humidity, to forcibly discharge harmful gas, and thereby to transport livestock or the like in a pleasant environment.

BACKGROUND ART

Generally, consumption of livestock bred for meat in a stable is increasing according to an improvement of dietary life style and a development of a westernized eating-out culture, and thus breeding of livestock for meat is becoming widespread and commercialized.

Livestock for meat are mainly bred on outskirts of a city which are less-affected by odors, waste or the like.

A rancher that breeds livestock for meat has need of a livestock transportation means which transports cultured livestock to a slaughterhouse or a livestock market for the purpose of slaughter or economic profit.

Since a general livestock transportation means has no shield, an odor may be discharged to an outside during livestock transportation, and an external appearance thereof may be aesthetically repellent to people. To prevent such problems, transportation is mostly performed while a cover is appropriately provided.

However, when livestock is transported using a vehicle, a ship or the like, livestock transportation is performed using a method in which a cargo box is partially opened, or the like, or in a state in which appropriate equipment is installed to prevent mortality of the livestock due to high heat generated from the livestock and various harmful gases generated from the livestock and an inside of the cargo box.

In such a livestock transportation method, due to high heat and humidity and harmful gases, weight of livestock located at an edge side is reduced, and meat therefrom is degraded regardless of season, the heat in summer, or the cold wind in winter. Most livestock mortality occurs during a transportation and shipping process.

DISCLOSURE

Technical Problem

The present invention is to evenly discharge internal air in every corner of a container by mounting a blowing means and a blowing pipe at an upper portion thereof, and to pleasantly maintain the internal air of the container by forcing external air to be introduced and discharged, thereby maintaining a hygienic welfare of livestock in an optimum state while quarantining during livestock transportation so that mortality of the livestock is prevented.

Also, the present invention is directed to providing a transportation container blower which is able to increase a distribution level of suctioned fresh air by installing an easily detachable auxiliary multi-section suctioning rod.

Technical Solution

One aspect of the present invention provides a transportation container blower for mortality prevention and welfare during livestock transportation, including a body (100) connected to a transportation means and having a space in which livestock is accommodated therein and a first blowing port (110) formed at each of lower portions of both sides thereof to be opened; a blowing path (200) installed at an upper end of the body (100) to be long in a longitudinal direction thereof and having a second blowing port (210) which is in communication with an inside of the body (100) and formed at a lower end or a side surface thereof; and a blowing means (300) installed at the body (100) and connected to the blowing path (200), wherein the blowing means (300), when operated, forces air in the body (100) to be blown through the first blowing port (110) and the second blowing port (210), thereby quarantining the livestock accommodated in the body (100) and pleasantly maintaining a hygienic condition of the livestock so that mortality of the livestock is prevented.

A plurality of second blowing ports (210) may be disposed to be spaced apart from each other in a longitudinal direction of the blowing path (200), and also may be formed so that a width of each thereof shrinks toward the blowing means (300). The blowing means (300) may be installed at a center of an upper end of the body (100).

The transportation container blower may further include an opening and closing cover (400) which is installed at the first blowing port (110) to open and close the first blowing port (110), and the opening and closing cover (400) may open the first blowing port (110) to forcibly blow impure air in the body (100) when the blowing means (300) is operated.

Advantageous Effects

The transportation container blower for livestock hygiene of the present invention as described above has the following effects.

Since the blowing means 300 is installed at the center of the upper end of the body 100 and connected to the blowing path 200, the air in the body 100 is evenly suctioned through the second blowing ports 210 and then discharged to the outside, and the internal environment is pleasantly maintained by introducing the external air inside through the first blowing ports 110, and thus the livestock is maintained in an optimum state during livestock transportation.

Since the second blowing port 210 is formed so that a width thereof shrinks toward the blowing means 300, air-blowing is evenly performed at every surface and corner of the body 100 when the blowing means 300 is operated.

DESCRIPTION OF DRAWINGS

FIG. 1 is a perspective view of a transportation container blower for livestock hygiene according to an embodiment of the present invention.

FIG. 2 is a structural cross-sectional view taken along A-A of FIG. 1.

FIG. 3 is a structural cross-sectional view taken along B-B of FIG. 2.

FIG. 4 is a view illustrating a state in which a second blowing port of the present invention is formed at a lower portion and a side surface.

FIG. 5 is a perspective view of a guide wing according to another embodiment of the present invention.

FIGS. 6 and 7 are partial cross-sectional views illustrating a usage state of a multi-section suctioning pipe according to still another embodiment of the present invention.

MODES OF THE INVENTION

Figure 7:
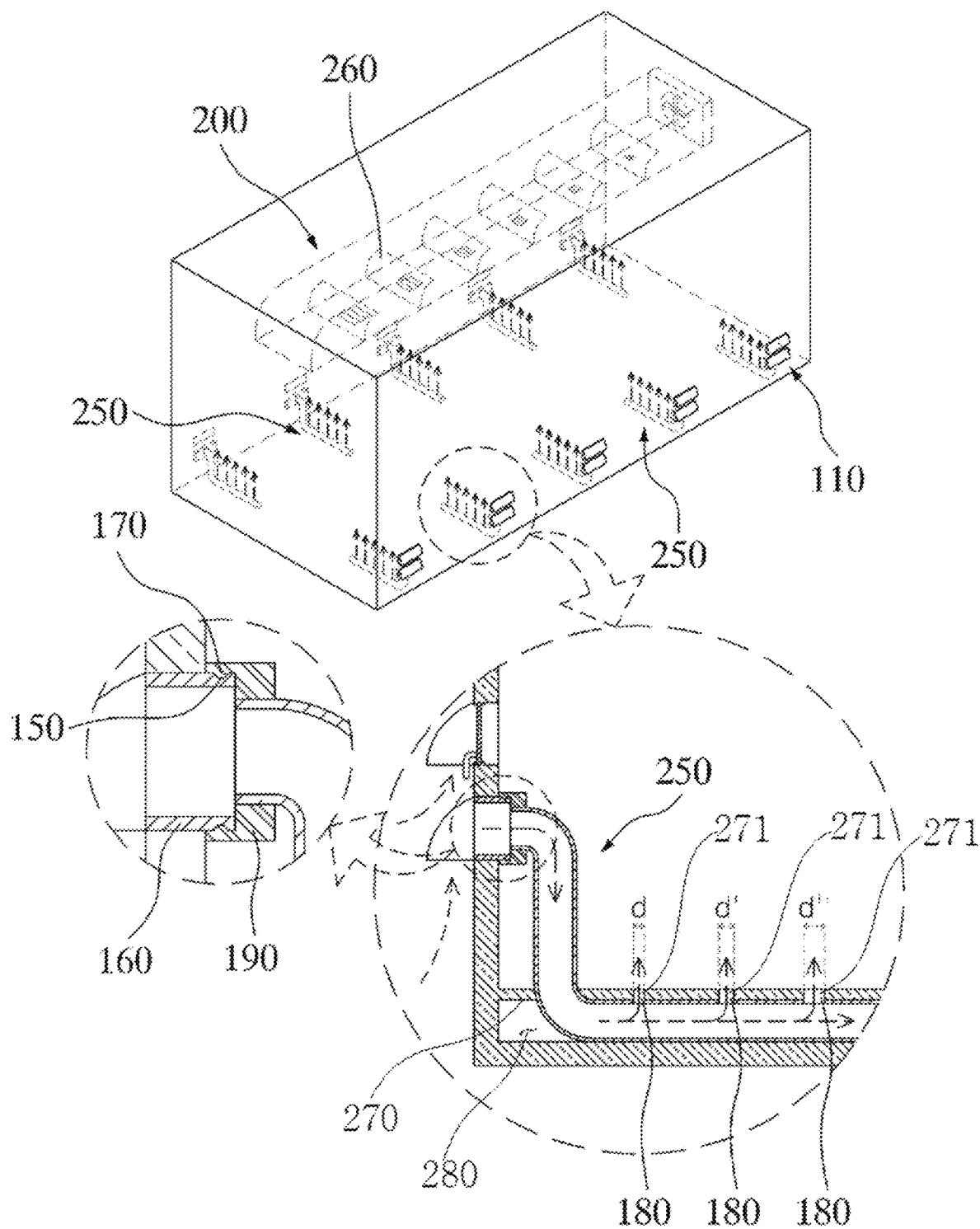

Hereinafter, a transportation container blower for mortality prevention and welfare during livestock transportation according to exemplary embodiments of the present invention will be described in detail with reference to the accompanying drawings.

It should be understood that the terms used in the specification and the appended claims are not to be construed as being limited to general and dictionary meanings, but should be interpreted based on the meanings and concepts corresponding to technical aspects of the present invention on the basis of the principle that the inventor is allowed to define terms appropriately for the best explanation. Therefore, the description proposed herein is simply a preferable example for the purpose of illustrations only and is not intended to limit the scope of the invention, so it should be understood that other equivalents and modifications could be made thereto without departing from the spirit and scope of the invention.

FIG. 1 is a perspective view of a transportation container blower for livestock hygiene according to an embodiment of the present invention, FIG. 2 is a structural cross-sectional view taken along A-A of FIG. 1, FIG. 3 is a structural cross-sectional view taken along B-B of FIG. 2, FIG. 4 is a view illustrating a state in which a second blowing port of the present invention is formed at a lower portion and a side surface, FIG. 5 is a perspective view of a guide wing according to another embodiment of the present invention, and FIGS. 6 and 7 are partial cross-sectional views illustrating a usage state of a multi-section suctioning pipe according to still another embodiment of the present invention.

A transportation container blower for livestock hygiene according to an embodiment of the present invention illustrated in FIGS. 1 to 4 includes a body 100, a blowing path 200, a blowing means 300, and an opening and closing cover 400.

The body 100 is a container formed in an approximately hexahedral shape, has a space which accommodates leather therein, and may be used by being connected to various transportation means such as a truck and a ship.

Also, the body may form a tent or a screen fence which prevents a truck for loading livestock such as chickens and ducks from being repellent to people while being driven on a road, or may include a tent or a screen fence which shuts out external cold wind or the like, and particularly, both side surfaces and a rear surface thereof may be opened to make loading and unloading of a container box easy.

A first blowing port 110 which is opened outward is formed around lower portions of both left and right side surfaces of the body 100.

A plurality of first blowing ports 110 are formed so that each has an approximately quadrangular shape, and are disposed to be spaced apart from each other at regular intervals in a longitudinal direction of the body 100.

Also, as illustrated in FIG. 3, a protective cover 120 which is opened downward may be installed at an upper portion of each of the first blowing ports 110.

The protective cover 120 is formed to be inclined downward, and is also formed so that a lower end thereof is opened to cover an upper edge of the first blowing port 110.

As such, since the protective cover 120 is installed at an upper portion of the first blowing port 110, rain or snow is prevented from being introduced into the body 110 through the first blowing port 110 when it rains or snows, and thus an internal environment of the body 100 may be pleasantly maintained.

Meanwhile, the blowing path 200 is formed of an approximately quadrangular-shaped pipe, and is installed to be long at a center portion of an upper end of the body 100 in the longitudinal direction thereof.

Of course, in some cases the blowing path 200 may be formed in various shapes such as a cylindrical shape.

As illustrated in FIG. 2, the blowing path 200 is formed so that a left end thereof is closed, and the blowing means 300 which will be described later is installed at a right end thereof, and thus the blowing path 200 serves as a path through which internal air of the main body 100 is suctioned and discharged to the outside. The blowing means includes a fan and a motor which are formed at an end of a center of an upper portion of the container to forcibly discharge the internal air to the outside.

Here, a second blowing port 210 which is in communication with the inside of the body 100 is formed at a lower portion of the blowing path 200 to be opened.

A plurality of second blowing ports 210 are provided, and are disposed to be spaced apart from each other in a longitudinal direction of the blowing path 200.

Also, each of the second blowing ports 210 is formed so that a width thereof shrinks toward the blowing means 300.

As described above, since the second blowing port 210 is formed so that a width thereof shrinks toward the blowing means 300, air-blowing is evenly performed at every surface and corner of the body 100 far from the blowing means 300, when the blowing means 300 is operated.

Meanwhile, the blowing means 300 is configured with a general large-sized fan, is installed at a right side of the body 100, and is connected to the right end of the blowing path 200, as illustrated in FIG. 2.

More specifically, as illustrated in FIG. 2, the blowing means 300 is disposed at a center of a rear upper end of the body 100.

The blowing means 300 suctions the internal air of the body 100 through the second blowing ports 210 and the blowing path 200, and then discharges the internal air to the outside. At this point, external fresh air is introduced inside through the first blowing ports 110.

Specifically, as illustrated in FIGS. 2 and 3, when the blowing means 300 is operated, fresh air is introduced through the first blowing ports 110 disposed at the lower portion of the body 100, and impure air in the body 100 flows toward the blowing path 200 through the second blowing ports 210 and is then discharged to the outside.

Here, the plurality of first blowing ports 110 and the plurality of second blowing ports 210 are disposed in the longitudinal direction of the body 100. In particular, the width of each of the second blowing ports 210 is formed to shrink toward the blowing means 300, and thus the air-blowing is performed at every corner of the body 100.

As described above, since the blowing means 300 is installed at the center of the upper end of the body 100 and is connected to the blowing path 200, the air in the body 100 is evenly suctioned through the second blowing ports 210 and is then discharged to the outside, the internal environment is pleasantly maintained by introducing the external air to the inside through the first blowing ports 110, and thus livestock is maintained in an optimum state during livestock transportation.

Meanwhile, as illustrated in FIG. 3, the opening and closing cover 400 is installed at each of the first blowing ports 110.

The opening and closing cover 400 is formed in a quadrangular plate shape to close the first blowing port 110 normally and then to open the first blowing port 110 by being slid when the blowing means 300 is operated.

As described above, since the opening and closing cover 400 is installed at the first blowing port 110, cold air may be prevented from being introduced inside by closing the first blowing port 110 when the weather is cold, and a flow rate of air may be controlled during air-blowing.

A transportation container blower for livestock hygiene according to another embodiment of the present invention illustrated in FIGS. 5 and 6 blows internal air to the outside, and is arranged, as will be described below, to discharge external fresh air to every inner corner.

As illustrated in FIG. 5, a guide wing 260 formed to have an inclined angle for air-blowing at a front or rear of each of the second blowing ports 210 is arranged in the blowing path 200.

The guide wing 260 forms an inclined surface in a discharging direction to enable rapid discharging when suctioned air is being discharged to the outside along the inclined surface so that the air is discharged to an outside of the rounded guide wing.

FIGS. 6 and 7 are characterized in that a multi-section suctioning pipe is easily detachably installed at each of the first blowing ports 110 to evenly circulate air in a plurality of stacked boxes in which ducks, chickens, or the like are accommodated.

It is preferable that a pipe or a flexible pipe (or a flexible tube) is used as a multi-section suctioning pipe 250.

An internal socket 160 in which a fitting groove 150 is formed therein to be coupled to the first blowing port 110, an external socket 190 in which a protrusion 170 is formed to be attached to and detached from the internal socket 160, and the multi-section suctioning pipe 250 which is coupled to the external socket which includes discharging holes (180). The discharging holes (180) of the external socket (190) have diameters d, d' and d" which shrink as an air suctioning distance from the outside is reduced are formed. As illustrated in FIG. 7, a plate (270) can be extended from an inner side surface of the body (100) to form a room (280) at a bottom portion of the body (100). In this case, the multi-section suctioning pipe (250) is inserted into the room (280) such that the multi-section suctioning pipe (250) is fixed at the bottom portion of the body (100). Also, the plate (270) includes openings (271) which communicate with the discharging holes (180), respectively.

Although a few embodiments of the present invention have been shown and described, it should be appreciated by those skilled in the art that changes may be made in these embodiments without departing from the principles and spirit of the invention, the scope of which is defined in the claims and their equivalents.

The invention claimed is:

1. A transportation container blower for mortality prevention and welfare during livestock transportation, comprising:
   a body (100) connected to a transportation means;
   a first blowing port (110) formed at an outer side surface of the body to introduce external air to an inside of the body;
   a blowing path (200) installed at an upper end of the body (100) to be long in a longitudinal direction thereof and having a plurality of second blowing ports (210) which is in communication with the inside of the body (100) and formed at a lower end or a side surface thereof;
   a protective cover (120) installed at an upper portion of the first blowing port (110), the protective cover (120) formed to be inclined downward and including a lower end portion which is opened;
   an internal socket (160) coupled to the first blowing port (110) and including a fitting groove (150);
   an external socket (190) coupled to the internal socket (160) and including a protrusion (170) which is inserted into the fitting groove (150);
   a plate (270) extended from an inner side surface of the body (100) to form a room at a bottom portion of the body (100);
   a multi-section suctioning pipe (250) coupled to the external socket (190) and inserted into the room such that the multi-section suctioning pipe (250) is fixed at the bottom portion of the body (100), wherein the a multi-section suctioning pipe (250) includes a discharging hole (180) and the plate (270) includes an opening (271) which communicates with the discharging hole (180); and
   a blowing means (300) installed at the body (100) and connected to the blowing path (200),
   wherein the blowing means (300), when operated, forces air in the body (100) to be blown through the first blowing port (110) and the plurality of second blowing ports (210), thereby quarantining the livestock accommodated in the body (100) and pleasantly maintaining a hygienic condition of the livestock so that mortality of the livestock is prevented.

2. The transportation container blower of claim 1, wherein the plurality of second blowing ports (210) are disposed to be spaced apart from each other in a longitudinal direction of the blowing path (200), and are also formed so that a width of each thereof shrinks toward the blowing means (300).

3. The transportation container blower of claim 1, further comprising an opening and closing cover (400) which is installed at the first blowing port (110) to open and close the first blowing port (110),
   wherein the opening and closing cover (400) opens the first blowing port (110) when the blowing means (300) is operated.

4. The transportation container blower of claim 1, wherein a guide wing formed to have an inclined angle for air-blowing at a front or rear of the plurality of second blowing ports (210) is formed in the blowing path (200.

* * * * *